United States Patent
Carleton et al.

(10) Patent No.: US 12,045,584 B2
(45) Date of Patent: Jul. 23, 2024

(54) UNDEPLOYED TOPOLOGY VISUALIZATION FOR IMPROVING SOFTWARE APPLICATION DEVELOPMENT

(71) Applicant: RED HAT, INC., Raleigh, NC (US)

(72) Inventors: Matthew John Carleton, Halifax (CA); Andrew R. Braren, Boston, MA (US); Peter Andrew Kreuser, Raleigh, NC (US); Yuval Galanti, Ra'anana (IL); Elizabeth Ann Blanchard, Westford, MA (US); Dana Matthew Gutride, Westford, MA (US); Carson Dashiell Copeland, Raleigh, NC (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/501,074

(22) Filed: Oct. 14, 2021

(65) Prior Publication Data
US 2023/0119064 A1    Apr. 20, 2023

(51) Int. Cl.
| | |
|---|---|
| *G06F 9/44* | (2018.01) |
| *G06F 8/30* | (2018.01) |
| *G06F 8/60* | (2018.01) |
| *G06F 9/445* | (2018.01) |
| *G06F 9/455* | (2018.01) |

(52) U.S. Cl.
CPC . *G06F 8/30* (2013.01); *G06F 8/60* (2013.01)

(58) Field of Classification Search
CPC ..................................... G06F 8/30; G06F 8/60
See application file for complete search history.

(56) References Cited

U.S. PATENT DOCUMENTS

| | | | |
|---|---|---|---|
| 10,445,221 B2 | 10/2019 | Bromann et al. | |
| 10,671,951 B2 | 6/2020 | Shrimali et al. | |

(Continued)

FOREIGN PATENT DOCUMENTS

| | | | | |
|---|---|---|---|---|
| CA | 2999619 C | * | 6/2020 | ........... G06F 3/0481 |
| CN | 110247794 A | * | 9/2019 | |

(Continued)

OTHER PUBLICATIONS

BizMap: A Framework for Mapping Business Applications to IT Infrastructure, 2019, pp. 1377-1384. https://ieeexplore.ieee.org/stamp/stamp.jsp?tp=&arnumber=7140500 (Year: 2019).*

(Continued)

*Primary Examiner* — Mongbao Nguyen
(74) *Attorney, Agent, or Firm* — Kilpatrick Townsend & Stockton LLP

(57) ABSTRACT

Software specifications can be improved using a visualization of an undeployed topology. For example, a computing device can receive, in a first portion of a user interface, source code for a software application. The computing device can receive, at a second portion of the user interface, an interaction for generating a topology corresponding to the source code for the software application. The computing device can generate, by a virtualized application programming interface (API) layer, the topology for the software application. The computing device can display, at the user interface, the topology as a visualization of an undeployed version of the software application that represents a deployable topology of the software application.

20 Claims, 6 Drawing Sheets

(56) References Cited

U.S. PATENT DOCUMENTS

| | | | | |
|---|---|---|---|---|
| 10,680,918 | B1* | 6/2020 | Mazzitelli | H04L 67/51 |
| 10,871,995 | B2 | 12/2020 | Gerdesmeier et al. | |
| 10,896,067 | B2 | 1/2021 | Vaddi et al. | |
| 11,194,688 | B1* | 12/2021 | Featonby | G06F 11/004 |
| 11,431,563 | B1* | 8/2022 | Holzman | H04L 41/22 |
| 11,467,826 | B1* | 10/2022 | Chawda | G06F 8/60 |
| 11,695,661 | B1* | 7/2023 | Cherkas | H04L 43/028 |
| | | | | 709/223 |
| 11,720,330 | B2* | 8/2023 | Duggal | G06F 8/36 |
| | | | | 717/107 |
| 2011/0307889 | A1* | 12/2011 | Moriki | G06F 9/5005 |
| | | | | 718/1 |
| 2015/0271023 | A1 | 9/2015 | Anderson et al. | |
| 2016/0308733 | A1* | 10/2016 | Chauhan | H04L 67/75 |
| 2017/0093645 | A1* | 3/2017 | Zhong | H04L 41/22 |
| 2018/0088937 | A1* | 3/2018 | Tamir | G06F 8/433 |
| 2020/0059420 | A1* | 2/2020 | Abraham | G06F 9/5072 |
| 2020/0133651 | A1* | 4/2020 | Holzer | G06F 8/65 |
| 2020/0241903 | A1* | 7/2020 | Wang | H04L 41/12 |
| 2021/0328877 | A1* | 10/2021 | Jung | H04L 41/12 |
| 2021/0342125 | A1* | 11/2021 | Burnett | G06F 8/34 |
| 2022/0027169 | A1* | 1/2022 | Burman | G06F 9/44505 |
| 2022/0035606 | A1* | 2/2022 | Walsh | G06F 8/34 |
| 2023/0019933 | A1* | 1/2023 | Wang | G06F 3/0484 |
| 2023/0049741 | A1* | 2/2023 | Liu | G06F 8/71 |
| 2023/0289147 | A1* | 9/2023 | Bauer | G06F 8/34 |
| | | | | 717/122 |

FOREIGN PATENT DOCUMENTS

| | | | | |
|---|---|---|---|---|
| CN | 110795148 A | * | 2/2020 | G06F 8/60 |
| CN | 112099919 A | * | 12/2020 | G06F 8/61 |
| JP | 2020177581 A | * | 10/2020 | H04L 41/12 |
| JP | 20200177581 A | * | 10/2020 | H04L 41/12 |
| WO | WO-2016053301 A1 | * | 4/2016 | H04L 41/0893 |

OTHER PUBLICATIONS

Haoxiang Wang, Network Topology Description and Visualization, 2010, pp. 52-56. https://ieeexplore.ieee.org/stamp/stamp.jsp?tp=&arnumber=5579362 (Year: 2010).*

Stefan Schneider, "Producing Cloud-Native": Smart Manufacturing Use Cases on Kubernetes, 2019, pp. 1-2. https://ieeexplore.ieee.org/stamp/stamp.jsp?arnumber=9040152 (Year: 2019).*

Americo Sampaio, An Approach for Evaluating Cloud Application Topologies Based on TOSCA, 2016, pp. 1-8., https://ieeexplore.ieee.org/stamp/stamp.jsp?tp=&arnumber=7820298 (Year: 2016).*

Jerome Petazzoni, Kubernetes Deployments: The Ultimate Guide, Apr. 2021, pp. 1-24. https://semaphoreci.com/blog/kubernetes-deployment (Year: 2021).*

Morenoa, et al., "Galaxy-Kubernetes Integration: Scaling Bioinformatics Workflows in the Cloud", https://www.biorxiv.org/content/10.1101/488643v1.full, Dec. 7, 2018, 3 pages.

Schneider et al., "Producing Cloud-Native: Smart Manufacturing Use Cases on Kubernetes", https://ieeexplore.ieee.org/abstract/document/9040152, Nov. 12, 2019, 3 pages.

* cited by examiner

FIG. 4

UNDEPLOYED TOPOLOGY VISUALIZATION FOR IMPROVING SOFTWARE APPLICATION DEVELOPMENT

TECHNICAL FIELD

The present disclosure relates generally to software development. More specifically, but not by way of limitation, this disclosure relates to undeployed topology visualization for improving software application development.

BACKGROUND

Software-development processes often involve a user inputting source code for a software application. The source code may be provided in a particular programing language. Examples of programming languages include Java, C, C++, and yet another markup language (YAML). Problems in the source code can lead to the software application performing incorrectly, so the source code can be tested to ensure that the software application performs as expected. The user may go through multiple rounds of source code drafting and testing before determining that the software application performs correctly.

BRIEF DESCRIPTION OF THE DRAWINGS

FIG. 4 is a diagram of a user interface for undeployed topology visualization in a third state according to some aspects of the present disclosure.

DETAILED DESCRIPTION

Figure 1:
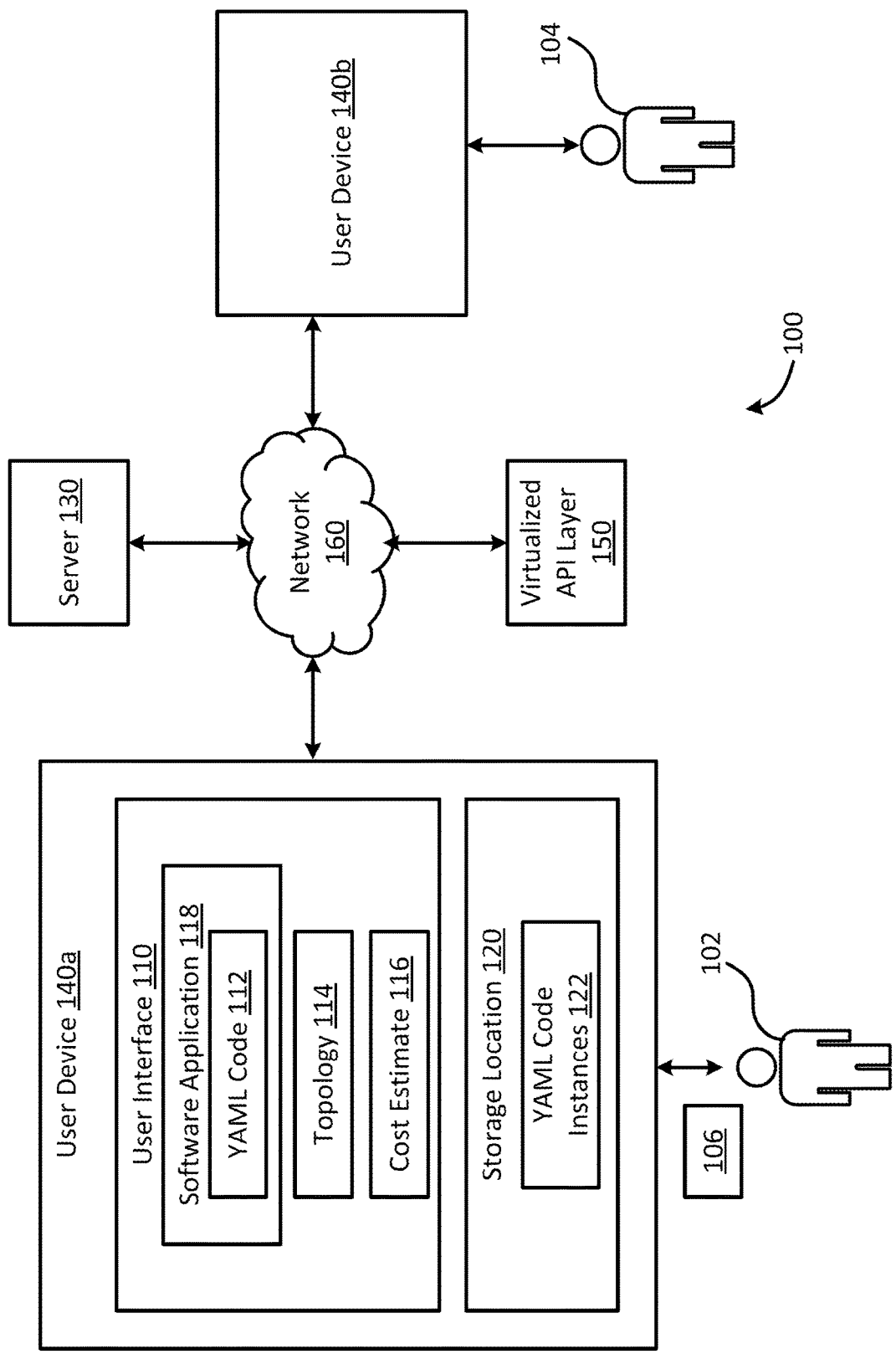
FIG. 1 is a block diagram of an example of a system for implementing undeployed topology visualization according to some aspects of the present disclosure.

Software-development processes can involve a user drafting source code for a software application. However, the user may not be familiar with the programming language of a particular platform. As a result, the source code can be missing key information or have other errors, leading to suboptimal development or testing of the software application. For example, the missing information can increase development time, reduce application functionality, and result in inadequate testing of the software application. Testing source code typically involves deploying the source code onto physical or virtual infrastructure, such as a bare metal cluster or a virtualized cluster, to generate a topology of the software application. In some examples, the physical or virtual infrastructure can be provided either by a cluster or a public cloud provider. Using the cluster or cloud provider may be resource-intensive and costly, especially for a user that is unfamiliar with the programming language and deploys the source code multiple times before determining the software application is satisfactory.

Some examples of the present disclosure can overcome one or more of the abovementioned problems by providing a user interface configured to generate a topology for source code provided by a user without using resources of a cluster or cloud provider. For example, the user interface can include a first portion for receiving source code, such as yet another markup language (YAML) code, for a software application, a second portion for receiving an interaction for generating a topology corresponding to the YAML code for the software application, and a third portion for displaying the topology as a visualization of an undeployed version of the software application that represents a deployable topology of the software application. Upon receiving the interaction at the second portion of the user interface, a virtualized application programming interface (API) layer can generate the topology without using a cluster or cloud provider. This can allow the user to visualize the topology for the YAML code without using the computing resources typically involved with topology generation. As a result, the user can update the YAML code until the resulting topology is satisfactory without increased resource usage. Additionally, the user interface can lower the barrier for users with less technical experience to designing software applications.

As a more specific example, a user can draft YAML code on a user device. The YAML code can describe features and processes for a software application. Once a user has drafted the YAML code, the user can select an option on the user device to generate a topology of the YAML code. A virtualized API layer generates the topology and presents the topology at the user device. The user can then determine to make edits to the YAML code, and an updated topology can be generated in real time. Once the user determines the undeployed version of the topology is satisfactory, the user can select an option on the user interface to deploy the YAML code and generate a deployed topology. This user interface can reduce computing resources and therefore the cost involved in the development of the software application, particularly for users with less software development experience.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing undeployed topology visualization according to some aspects of the present disclosure. The system 100 can include user devices 140a-b. Examples of the user devices 140a-b can include a laptop computer, desktop computer, server, mobile phone, etc. The system 100 can additionally include a server 130 and a virtualized application programming interface (API) layer 150. As shown in FIG. 1, some or all of these components can communicate with one another via a network 160, such as a local area network (LAN) or the Internet.

In some examples, the user device 140a can include a user interface 110. The user interface 110 can be part of a website, a standalone application, a word processor, an integrated development environment (IDE), etc. A user 102 can interact with the user device 140a to draft source code, such as yet another markup language (YAML) code 112, for a software application 118. The user 102 may or may not be an end user of the software application 118. The YAML code 112 can be received at a first portion, such as a text box, of the user interface 110. For example, the user 102 may type the YAML code 112 in the first portion of the user interface 110. Alternatively, the user 102 may select a portion of the user interface 110 for performing an import operation. The user interface 110 can display YAML code instances 122 that are accessible to the user 102 for creating the software application 118. The YAML code instances 122 can be files of YAML code stored in a storage location 120 that is accessible by the user interface 110. Although the storage location 120 is shown as part of the user device 140a, the storage location 120 may alternatively be remote to the user device 140a. The user interface 110 can receive a selection for the YAML code 112 from the YAML code instances 122 and then display the YAML code 112 in the first portion of the user interface 110.

Once the YAML code 112 is received at the user interface 110, the user interface can receive an interaction 106 for generating a topology 114 that corresponds to the YAML code 112 for the software application 118. The topology 114 can show a relationship between components of the software application 118, as defined by the YAML code 112. The interaction 106 may involve the user 102 selecting a portion of the user interface 110, such as a button, that indicates the YAML code 112 is to be processed. The topology 114 can be a visualization of an undeployed version of the software application 118 that represents a deployable topology of the software application. In other words, if the YAML code 112 was to be deployed (e.g., using a cloud provider or a cluster), the topology 114 represents a result of the deployment.

In response to receiving the interaction 106, the virtualized API layer 150 can generate the topology 114 for the software application 118. Rather than relying on a cloud provider or a cluster to deploy the software application 118 and generate the corresponding topology, the virtualized API layer 150 can generate the topology 114 without the software application 118 being deployed. Once the topology 114 is generated, the user interface 110 can display the topology 114. The topology 114 may be displayed in a portion of the user interface 110 that is different from the first portion that receives the YAML code 112. As such, the YAML code 112 and the topology 114 may be both be displayed at the user interface 110 simultaneously.

In some examples, the user interface 110 may receive additional YAML code, or another change to the YAML code 112, subsequent to the user interface 110 displaying the topology 114. The virtualized API layer 150 may automatically generate an updated topology based on the change to the YAML code 112. In some instances, the user interface 110 may receive an action from the user 102 to generate the updated topology. The updated topology can represent an updated deployable topology of the software application 118. The user interface 110 can then display the updated topology.

The user interface 110 can receive additional interaction 106 from the user 102. For example, the user interface 110 may receive a selection for deploying the software application 118. In response, the YAML code 112 for the software application 118 can be deployed and a deployed topology can be generated. In addition, the user interface 110 can receive a selection from the user 102 associated with sending the YAML code 112 to a second user 104. Upon receiving the selection, the YAML code 112 can be sent to the user device 140b to display to the second user 104. In an example, a uniform resource locator (URL) including the YAML code 112 may be sent. The second user 104 can then update, store, or use the YAML code 112.

In some examples, the user interface 110 can determine a cost estimate 116 associated with deploying the software application 118. The cost estimate 116 may be based on known costs associated with computing resources, such as network, storage, and processing resources, and a determination of the computing resources involved in deploying the software application 118. The cost estimate 116 can be associated with an infrastructure provider, such as a cloud provider, of the resources. The user interface 110 can display the cost estimate 116 and update the cost estimate 116 over time as the YAML code 112 or the known costs change.

While FIG. 1 shows a specific number and arrangement of components, other examples may involve more components, fewer components, different components, or a different arrangement of the components shown in FIG. 1. For example, while FIG. 1 describes inputting YAML code and generating a topology accordingly, other examples may involve a different programming language, such as Java, C, C++, etc. Additionally, while the above examples attribute certain functionality to the user device 140a, other implementations are possible. For example, at least some of the components and functionality can be offloaded to a server 130. As one particular example, the user interface 110 can be part of a webpage generated by the server 130 and served to the user devices 140a-b over the network 160. The server 130 may call the virtualized API layer 150 to generate the topology 114 of the undeployed version of the software application 118. The server 130 may also provide the user 102 with the cost estimate 116 through the webpage. In some examples, the server 130 can further generate an online portal that serves as an intermediary between the user 102 and the second user 104 to facilitate communications between the two.

Figure 2:
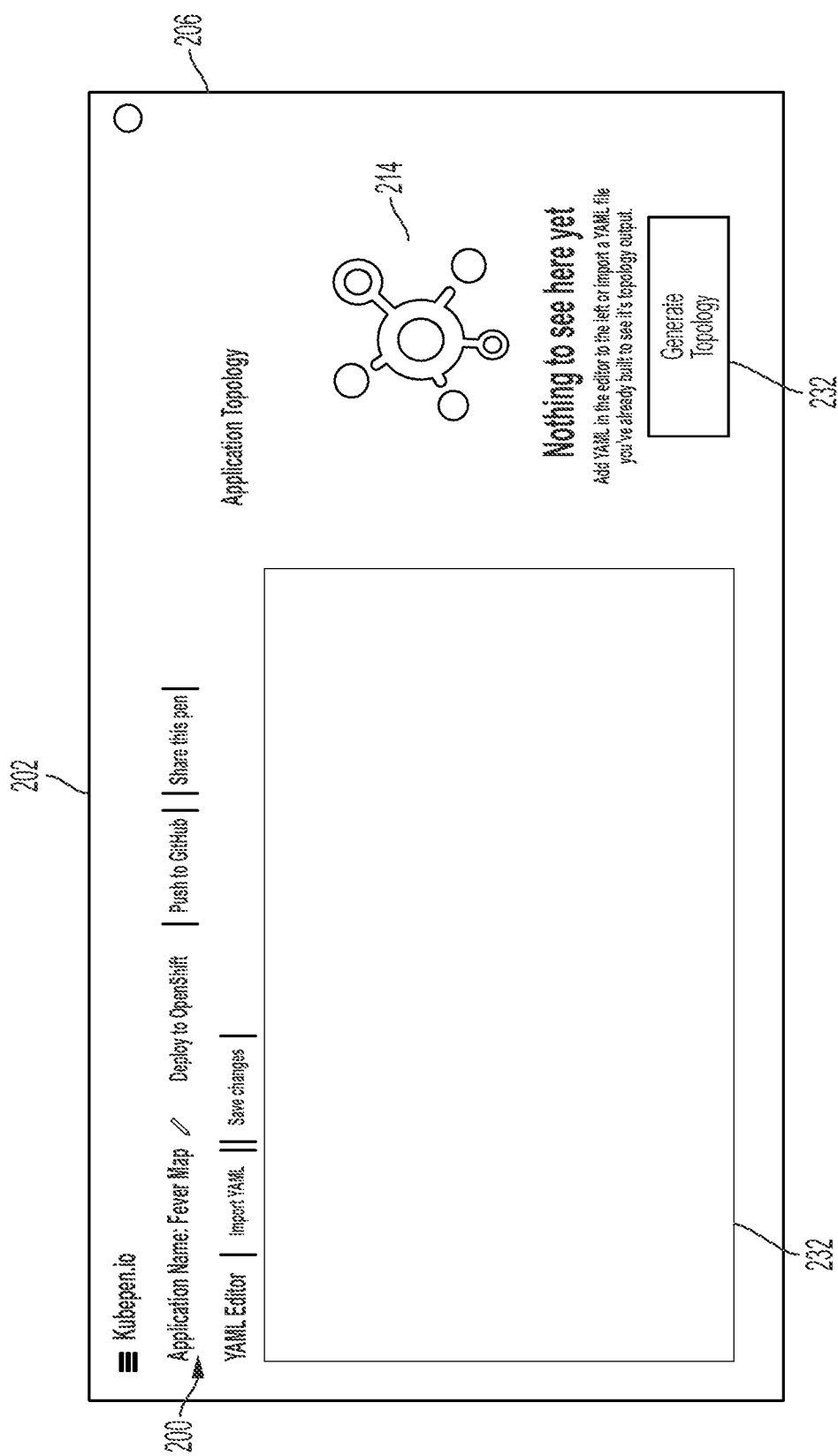
FIG. 2 is a diagram of a user interface for undeployed topology visualization in a first state according to some aspects of the present disclosure.

FIG. 2 is a diagram of a user interface 200 for undeployed topology visualization in a first state according to some aspects of the present disclosure. The user interface 200 includes a website browser 202 including a webpage 206. A user, such as a software developer, can navigate to the webpage 206 via a website browser 202. For example, the user can input an address for the webpage 206 (e.g., URL for the webpage) into an address box of the website browser 202. The website browser 202 can obtain website code for the webpage 206 and render the webpage 206 using the website code.

In some examples, the user interface 200 can include a first portion, such as a text box 232, where the user can input code (e.g., YAML code 112 in FIG. 1) for a software application, such as the software application 118 in FIG. 1. The user may type the YAML code into the text box 232, or the user may import the YAML code from an external location. As illustrated in FIG. 2, there may be an "Import YAML" button on the user interface 200 that is selectable by the user. In the first state, a topology is not yet generated, so a portion of the user interface 200, such as portion 214, may be empty or display an indication that the topology is not yet generated. Once a user has input the YAML code to the text box 232, the user can provide a selection via a portion of the user interface 200 indicating the topology is to be created. As illustrated, the user may interact with a "generate topology" button 234 on the user interface 200 to generate the topology. Alternatively, the topology may be generated automatically once the user imports the YAML code into the text box 232.

Figure 3:
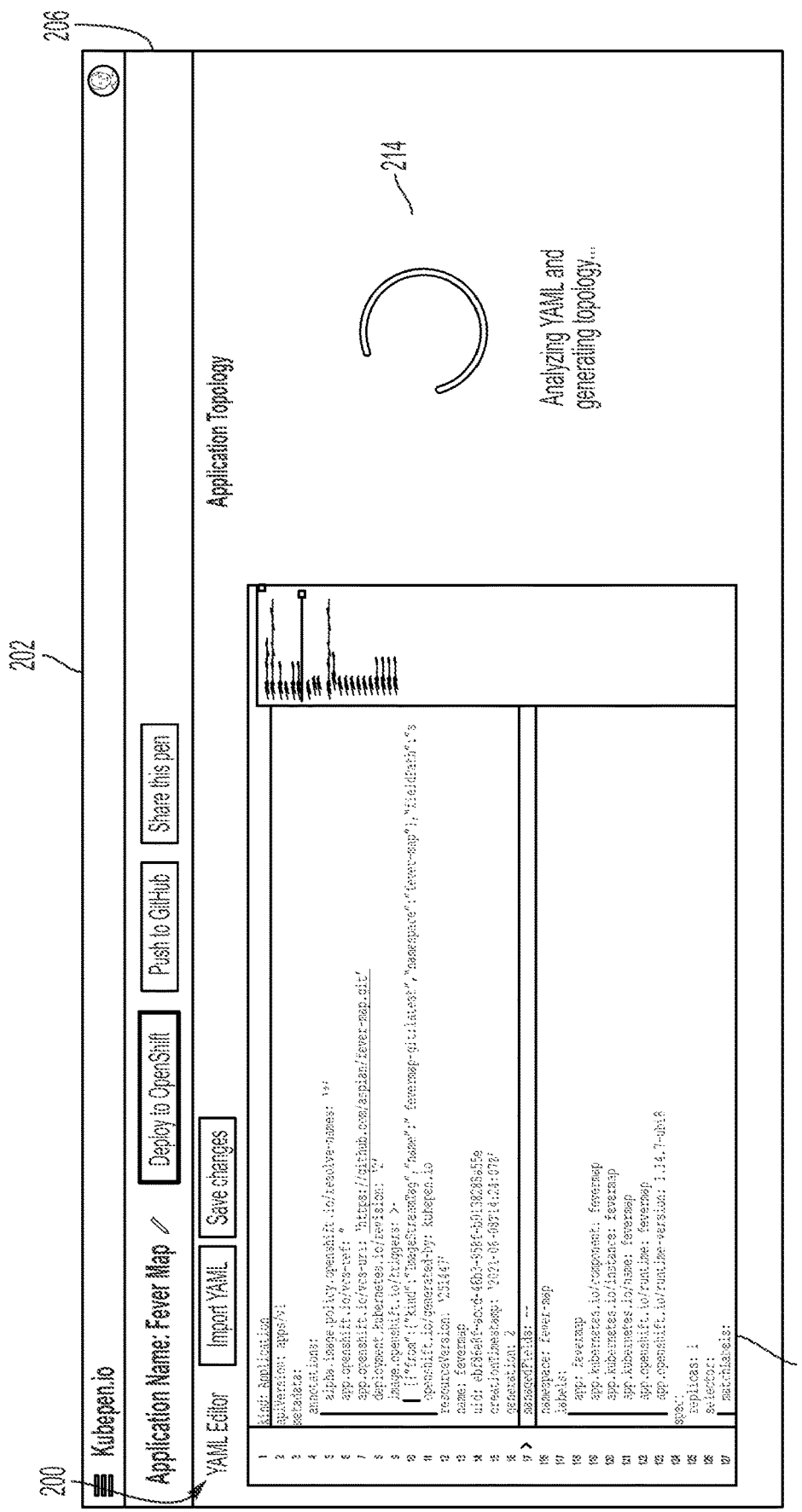
FIG. 3 is a diagram of a user interface for undeployed topology visualization in a second state according to some aspects of the present disclosure.

FIG. 3 is a diagram of a user interface 200 for undeployed topology visualization in a second state according to some aspects of the present disclosure. The second state corresponds to the user interface 200 while the topology is being generated. The text box 232 includes the YAML code and the portion 214 of the webpage 206 for displaying the topology indicates that the topology is being generated. A virtualized API layer, such as the virtualized API layer 150 in FIG. 1, can generate the topology based on the YAML code in the text box 232 without deploying the YAML code.

Figure 4:
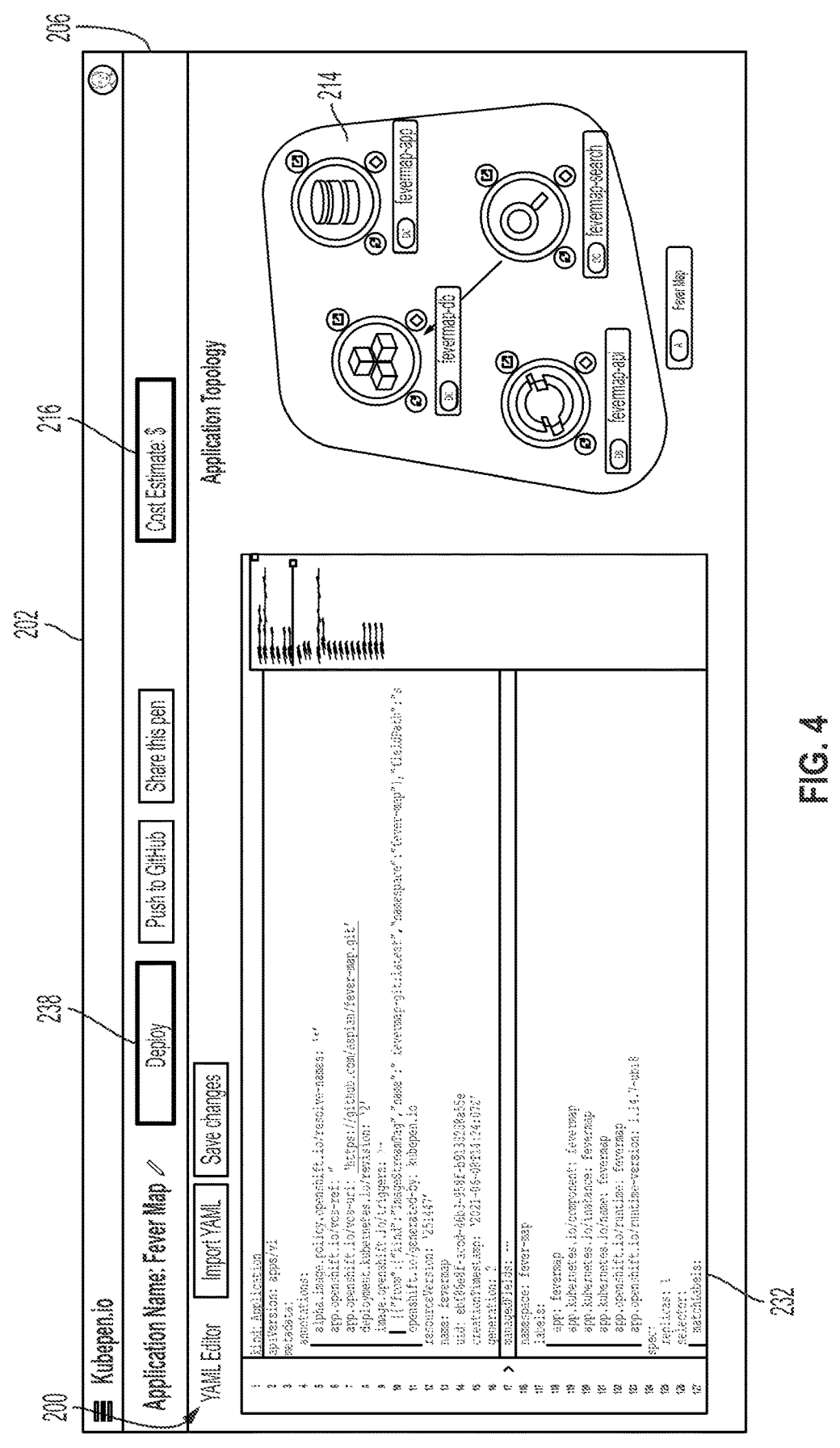

FIG. 4 is a diagram of a user interface 200 for undeployed topology visualization in a third state according to some aspects of the present disclosure. The third state corresponds to the user interface 200 subsequent to the topology being generated. The topology, as shown in the portion 214 of the user interface 200, represents a visualization of an undeployed version of the software application that corresponds to the YAML code in the text box 232. Once the topology is generated, the user can update the YAML code in the text box 232, and the user interface 200 can automatically update the topology using the virtualized API layer.

Additionally, the user interface 200 may indicate a cost estimate 216 associated with deploying the software application. As illustrated, the user interface 200 may include the cost estimate 216 in proximity to the topology on the webpage 206. The user interface 200 can also present the user with an option to deploy the YAML code to generate a deployed topology of the software application. As illustrated, the user interface 200 may include a "deploy" button 238 that the user can select once the user determines the topology presented in portion 214 of the user interface 210 is satisfactory. In this way, computing resources involved with deploying the software application may only be used once the user determines the topology is as desired, thus conserving resources and cost.

While FIGS. 2-4 show examples of a user interface 200 for illustrative purposes, other examples may involve more components, fewer components, different components, or a different arrangement of the components shown in FIGS. 2-4. For example, although the portion 214 for the topology is depicted as embedded on the webpage 206 adjacent to the text box 232 in FIGS. 2-4, in other examples the content can be conveyed to the user using other approaches, such as through a pop-up window on the webpage 206.

Figure 5:
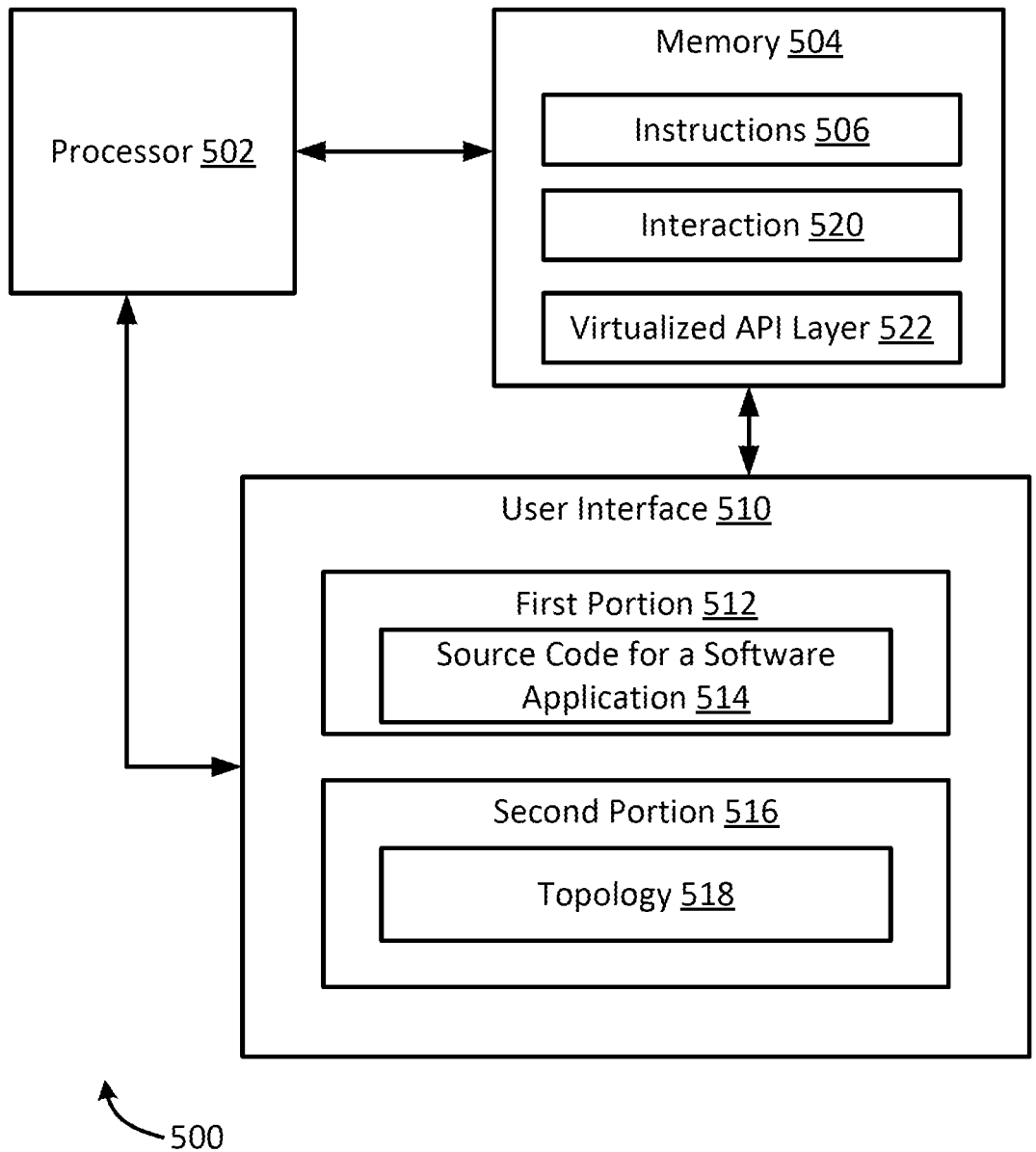
FIG. 5 is a block diagram of another example of a system for implementing undeployed topology visualization according to some aspects of the present disclosure.

FIG. 5 is a block diagram of another example of a system 500 for implementing undeployed topology visualization according to some aspects of the present disclosure. The system 500 includes a processor 502 communicatively coupled with a memory 504. In some examples, the processor 502 and the memory 504 can be part of the same computing device, such as the user device 140*a* of FIG. 1. In other examples, the processor 502 and the memory 504 can be distributed from (e.g., remote to) one another.

The processor 502 can include one processor or multiple processors. Non-limiting examples of the processor 502 include a Field-Programmable Gate Array (FPGA), an application-specific integrated circuit (ASIC), a microprocessor, etc. The processor 502 can execute instructions 506 stored in the memory 504 to perform operations. In some examples, the instructions 506 can include processor-specific instructions generated by a compiler or an interpreter from code written in any suitable computer-programming language, such as C, C++, C#, etc.

The memory 504 can include one memory or multiple memories. The memory 504 can be non-volatile and may include any type of memory that retains stored information when powered off. Non-limiting examples of the memory 504 include electrically erasable and programmable read-only memory (EEPROM), flash memory, or any other type of non-volatile memory. At least some of the memory 504 can include a non-transitory computer-readable medium from which the processor 502 can read instructions 506. A computer-readable medium can include electronic, optical, magnetic, or other storage devices capable of providing the processor 502 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 506.

In some examples, the processor 502 can execute instructions 506 to perform various operations. For example, the processor 502 can receive, in a first portion 512 of a user interface 510, source code for a software application 514. For example, the processor 502 can receive YAML, Java, C, or C++ code for the software application 514 in a text box of the user interface 510. The processor 502 can receive, at a second portion 516 of the user interface 510, an interaction 520 for generating a topology 518 corresponding to the source code for the software application 514. The processor 502 can generate, by a virtualized API layer 522, the topology 518 for the software application. The processor 502 can then display, at the user interface 510, the topology 518 as a visualization of an undeployed version of the software application that represents a deployable topology of the software application. As a result of using the virtualize API layer to generate the topology 518 without deploying the YAML code for the software application 514, fewer computing resources are involved and fewer deployments using the computing resources may be made.

Figure 6:
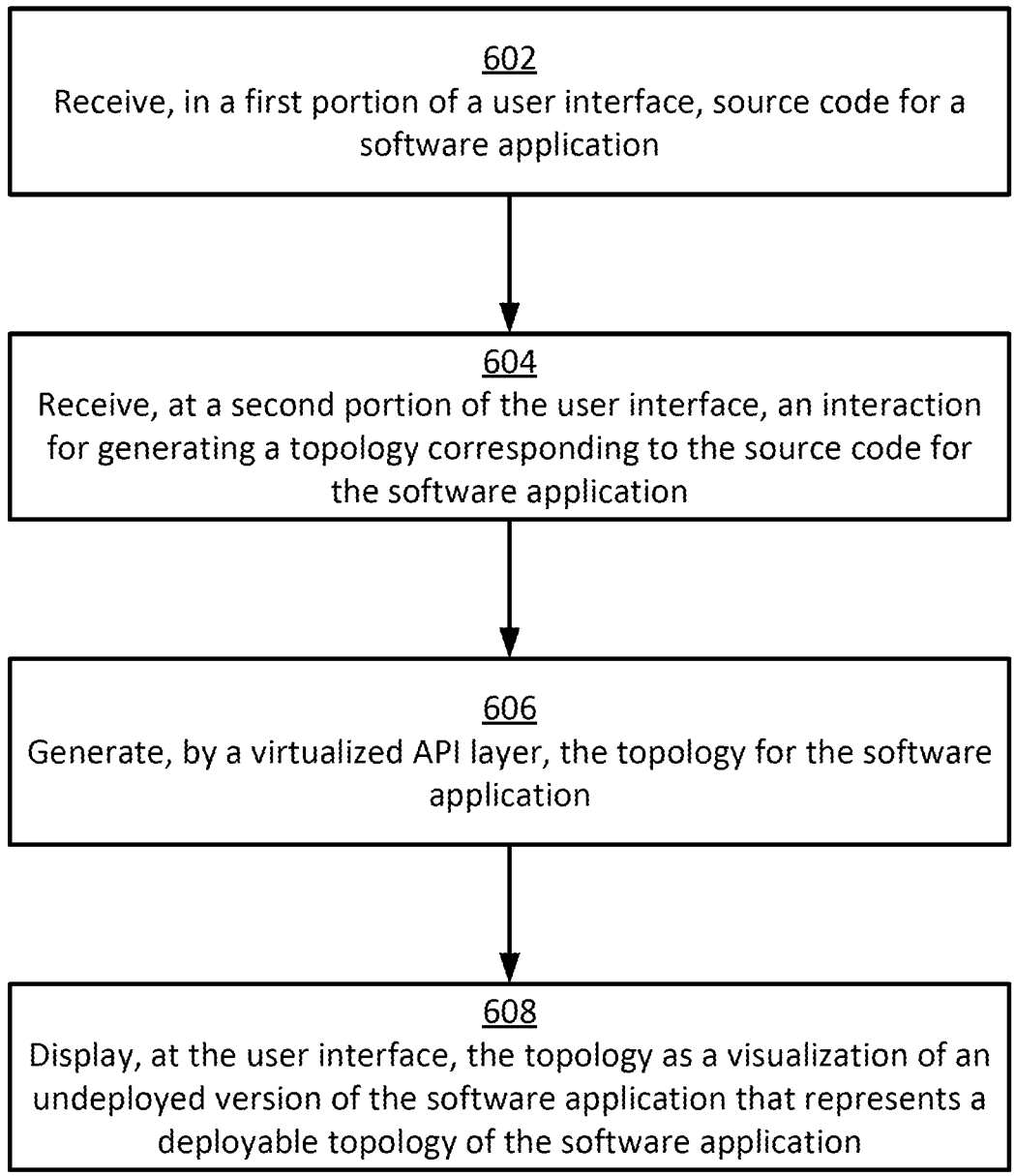
FIG. 6 is a flow chart of an example of a process for implementing undeployed topology visualization according to some aspects of the present disclosure.

In some examples, the processor 502 can implement some or all of the steps shown in FIG. 6. Other examples can include more steps, fewer steps, different steps, or a different order of the steps than is shown in FIG. 6. The steps of FIG. 6 are discussed below with reference to the components discussed above in relation to FIG. 5.

In block 602, a processor 502 receives, in a first portion 512 of a user interface 510, source code for a software application 514. The source code for the software application 514 can be typed or imported by a user. The source code may be in YAML, Java, C, C++, or another programming language. In an example, the first portion 512 corresponds to a text box on a left side of the user interface 510.

In block 604, the processor 502 receives, at a second portion 516 of the user interface 510, an interaction 520 for generating a topology 518 corresponding to the source code for the software application 514. The interaction 520 may be a selection of a button, or other feature, of the user interface 510.

In block 606, the processor 502 generates, by a virtualized API layer 522, the topology 518 for the software application. The virtualized API layer 522 can generate the topology 518 without the use of a cluster or cloud provider, thereby reducing resources involved in development of the software application.

In block 608, the processor 502 displays, at the user interface 510, the topology 518 as a visualization of an undeployed version of the software application that represents a deployable topology of the software application. This visualization can allow a user to determine whether the topology 518 is satisfactory, make updates to the source code for the software application 514, and see updates to the topology 518 in real time until the topology 518 is satisfactory. Then the processor 502 can deploy the source code for the software application 514 using the cluster or cloud provider.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

What is claimed is:

1. A computer-implemented method comprising:
displaying, by a processor, source code for a software application in a first portion of a user interface, the first portion of the user interface being a text box configured to receive the source code as an input;
receiving, by the processor, an interaction at a second portion of the user interface, the interaction being for generating a topology corresponding to the source code for the software application;
generating, by the processor and using a virtualized application programming interface (API) layer, the topology for the software application corresponding to the source code; and
displaying, by the processor, while the source code is displayed in the first portion of the user interface, and in response to the interaction, the topology at a third portion of the user interface as a visualization of an undeployed version of the software application that represents a deployable topology of the software application, the user interface including a deploy feature for deploying the source code and an estimation feature for generating a value estimation associated with deploying the software application.

2. The computer-implemented method of claim 1, further comprising:
receiving additional source code subsequent to the user interface displaying the topology;
in response to receiving the additional source code, generating an updated topology for the software application using the virtualized API layer; and
displaying the updated topology that represents an updated deployable topology of the software application.

3. The computer-implemented method of claim 1, wherein receiving the source code comprises:
receiving a first selection at the user interface for an import operation;
displaying a plurality of source code instances stored in a storage location associated with the import operation, the plurality of source code instances including the source code for the software application; and
receiving a second selection for the source code from the plurality of source code instances.

4. The computer-implemented method of claim 1, further comprising:
determining, in response to a selection of the estimation feature, a cost estimate associated with deploying the software application; and
displaying the cost estimate at the user interface.

5. The computer-implemented method of claim 1, further comprising:
receiving a selection of the deploy feature at the user interface for deploying the software application; and
deploying the software application using a cluster or cloud provider to generate a deployed topology.

6. The computer-implemented method of claim 1, wherein the source code is generated by a first user and the user interface includes a share feature, and the method further comprises:

receiving a selection of the share feature at the user interface to send the source code to a second user for display at a second user interface associated with the second user.

7. The computer-implemented method of claim 1, wherein the user interface is part of a webpage.

8. A non-transitory computer-readable medium comprising program code that is executable by a processor for causing the processor to:
display, in a first portion of a user interface, source code for a software application, the first portion of the user interface being a text box configured to receive the source code as an input;
receive, at a second portion of the user interface, an interaction for generating a topology corresponding to the source code for the software application;
generate, by a virtualized application programming interface (API) layer, the topology for the software application corresponding to the source code; and
display, at a third portion of the user interface while the source code is displayed in the first portion of the user interface and in response to the interaction, the topology as a visualization of an undeployed version of the software application that represents a deployable topology of the software application, the user interface including a deploy feature for deploying the source code and an estimation feature for generating a value estimation associated with deploying the software application.

9. The non-transitory computer-readable medium of claim 8, further comprising program code that is executable by the processor for causing the processor to:
receive additional source code subsequent to the user interface displaying the topology;
in response to receiving the additional source code, generate an updated topology for the software application using the virtualized API layer; and
display the updated topology that represents an updated deployable topology of the software application.

10. The non-transitory computer-readable medium of claim 8, further comprising program code that is executable by the processor for causing the processor to receive the source code by:
receiving a first selection of an import feature at the user interface for an import operation;
displaying a plurality of source code instances stored in a storage location associated with the import operation, the plurality of source code instances including the source code for the software application; and
receiving a second selection for the source code from the plurality of source code instances.

11. The non-transitory computer-readable medium of claim 8, further comprising program code that is executable by the processor for causing the processor to:
determine, in response to a selection of the estimation feature, a cost estimate associated with deploying the software application; and
display the cost estimate at the user interface.

12. The non-transitory computer-readable medium of claim 8, further comprising program code that is executable by the processor for causing the processor to:
receive a selection of the deploy feature at the user interface for deploying the software application; and
deploy the software application using a cluster or cloud provider to generate a deployed topology.

13. The non-transitory computer-readable medium of claim 8, wherein the source code is generated by a first user and the user interface includes a share feature, and the non-transitory computer-readable medium further comprises program code that is executable by the processor for causing the processor to:
receive a selection of the share feature at the user interface to send the source code to a second user for display at a second user interface associated with the second user.

14. A system comprising:
a processor; and
a memory including instructions executable by the processor for causing the processor to:
display, in a first portion of a user interface, source code for a software application, the first portion of the user interface being a text box configured to receive the source code as an input;
receive, at a second portion of the user interface, an interaction for generating a topology corresponding to the source code for the software application;
generate, by a virtualized application programming interface (API) layer, the topology for the software application corresponding to the source code; and
display, at a third portion of the user interface while the source code is displayed in the first portion of the user interface and in response to the interaction, the topology as a visualization of an undeployed version of the software application that represents a deployable topology of the software application, the user interface including a deploy feature for deploying the source code and an estimation feature for generating a value estimation associated with deploying the software application.

15. The system of claim 14, wherein the memory further includes instructions that are executable by the processor for causing the processor to:
receive additional source code subsequent to the user interface displaying the topology;
in response to receiving the additional source code, generate an updated topology for the software application using the virtualized API layer; and
display the updated topology that represents an updated deployable topology of the software application.

16. The system of claim 14, wherein the memory further includes instructions that are executable by the processor for causing the processor to receive the source code by:
receiving a first selection of an import feature at the user interface for an import operation;
displaying a plurality of source code instances stored in a storage location associated with the import operation, the plurality of source code instances including the source code for the software application; and
receiving a second selection for the source code from the plurality of source code instances.

17. The system of claim 14, wherein the memory further includes instructions that are executable by the processor for causing the processor to:
determine, in response to a selection of the estimation feature, a cost estimate associated with deploying the software application; and
display the cost estimate at the user interface.

18. The system of claim 14, wherein the memory further includes instructions that are executable by the processor for causing the processor to:
receive a selection of the deploy feature at the user interface for deploying the software application; and
deploy the software application using a cluster or cloud provider to generate a deployed topology.

19. The system of claim 14, wherein the source code is generated by a first user and the user interface includes a share feature, and the memory further includes instructions that are executable by the processor for causing the processor to:
receive a selection of the share feature at the user interface to send the source code to a second user for display at a second user interface associated with the second user.

20. The system of claim 14, wherein the user interface is part of a webpage.

* * * * *